June 30, 1959 W. S. MARTIN 2,892,286
DUSTING DEVICE
Filed Jan. 11, 1957 2 Sheets-Sheet 1
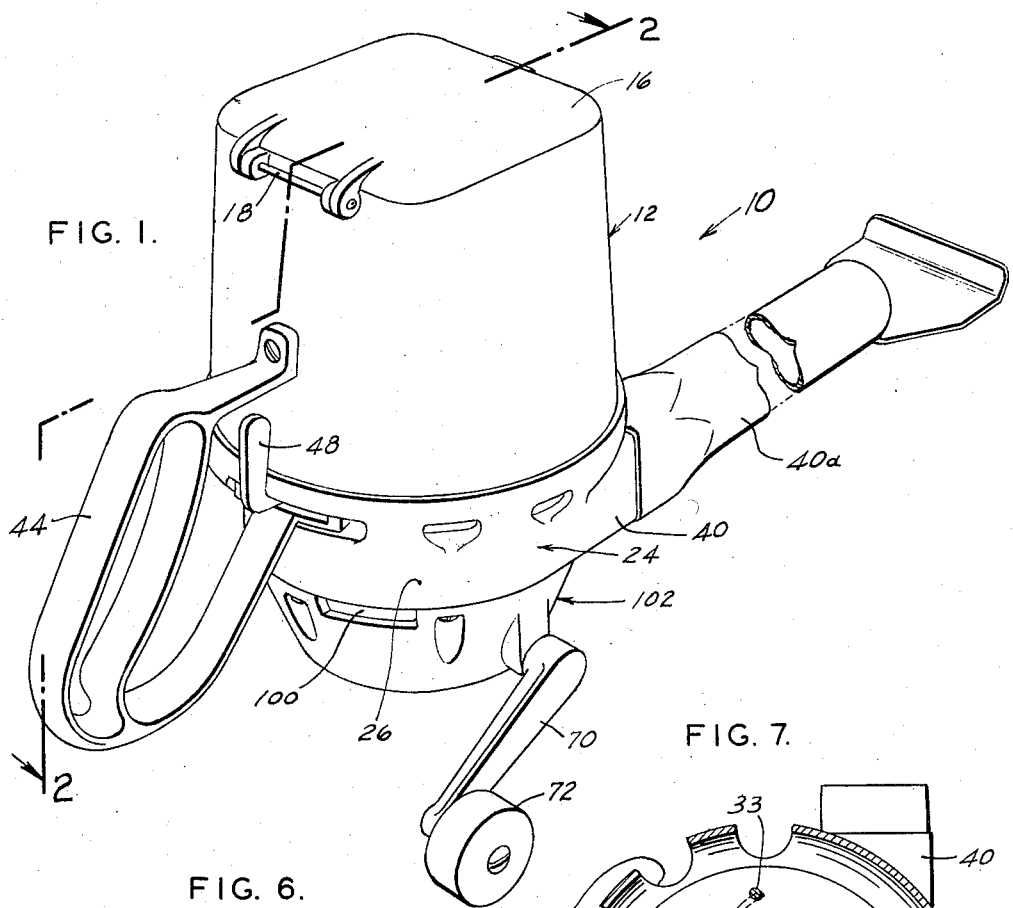
FIG. 1.
FIG. 6.
FIG. 7.
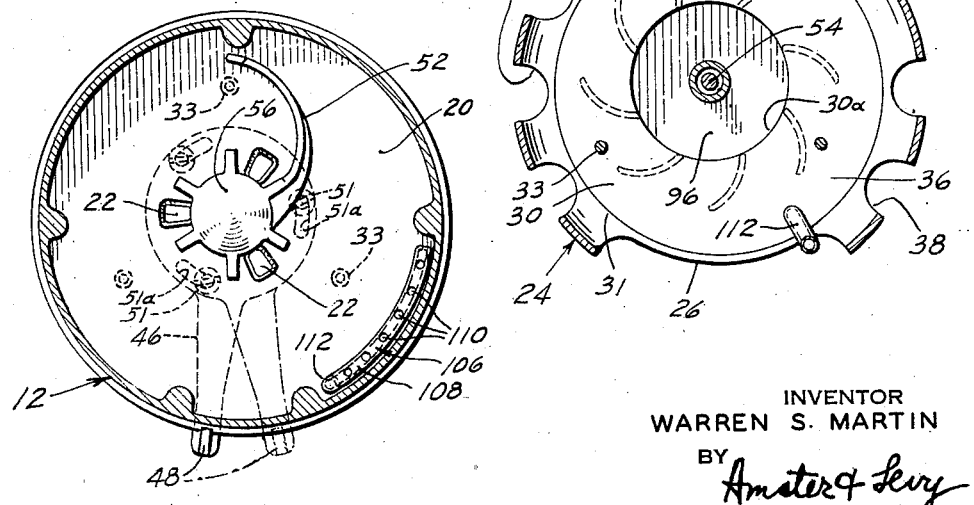
INVENTOR
WARREN S. MARTIN
BY *Amster & Levy*
ATTORNEY

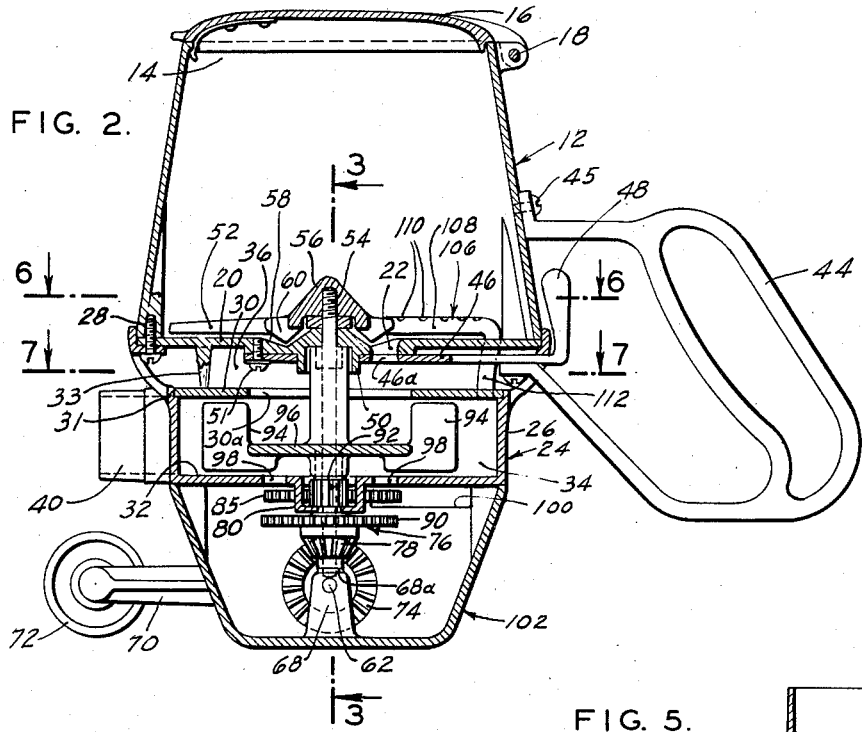

United States Patent Office 2,892,286
Patented June 30, 1959

2,892,286

DUSTING DEVICE

Warren S. Martin, Babylon, N.Y., assignor to Plant Products Corporation, Blue Point, N.Y., a corporation of New York Application January 11, 1957, Serial No. 633,577

9 Claims. (Cl. 43—148)

The present invention relates to powder-disseminating devices, and in particular to manually-operable apparatus for distributing dusting compositions, such as insecticides.

Hand-operated portable devices are known which incorporate a rotary blower effective to admix a dusting composition with a stream of air for spreading the dusting composition over comparatively large areas with a reasonable degree of uniformity and at a comparatively rapid rate. The construction of such devices is subject to a latitude of variation, but characteristically it is difficult to attain relatively high blower heads or pressures and there is not reasonable assurance of trouble free operation. Still further, a troublesome problem is presented in gasketing the driving mechanism from the blower to avoid clogging of the driving mechanism as a result of continued exposure to dust residues which accumulate in use.

Broadly, it is an object of the present invention to provide a manually operable and portable dusting device obviating one or more of the aforesaid difficulties. Specifically, it is within the contemplation of the present invention to provide apparatus for disseminating a dusting composition in an air stream in which positive provision is made for maintaining the driving mechanisms free of dust accumulation.

It is a still further object of the present invention to provide a blower for distributing a dusting composition which is comparatively simple in construction, yet is capable of developing high speeds with comparatively low friction and low noise output.

In accordance with an illustrative embodiment demonstrating features of the present invention, there is provided a manually-operated portable dusting device which comprises a body including a hopper section having a bottom, an air inlet section in communication with said hopper section and having main air inlet ports, a blower section below said air inlet section and having an annular blower chamber in communication with said main air inlet ports and a drive housing section below and in communication with said blower chamber. An upright shaft is arranged eccentrically of said blower chamber and extends from said drive housing section to said hopper section. Agitating means are disposed in said hopper section and are operatively connected to and driven from said upright shaft, while a rotor is disposed within said blower chamber and is journaled on said shaft for rotation about said shaft as an axis. An appropriate drive is operatively connected to said upright shaft and to said agitating means so that both may be turned at prescribed rates for delivering the dusting composition to said blower chamber for dissemination.

The above brief description, as well as further objects, features and advantages of the present invention will be best appreciated by reference to the following detailed description of a presently preferred but illustrative embodiment, when taken in conjunction with the accompanying drawing, wherein:

Fig. 1 is a perspective view of a manually-operated portable dusting device embodying features of the present invention;

Fig. 2 is an elevational view with parts broken away and sectioned, taken substantially along the line 2—2 of Fig. 1 and looking in the direction of the arrows;

Fig. 3 is a fragmentary sectional view taken substantially along the line 3—3 of Fig. 2, looking in the direction of the arrows and showing the details of the driving mechanism;

Fig. 4 is a sectional view taken substantially along the line 4—4 of Fig. 3;

Fig. 5 is a sectional view taken substantially along the line 5—5 of Fig. 3 and looking in the direction of the arrows;

Fig. 6 is a sectional view taken substantially along the line 6—6 of Fig. 2 and looking in the direction of the arrows; and Fig. 7 is a sectional view taken substantially along the line 7—7 of Fig. 2 and looking in the direction of the arrows.

Referring now more specifically to the drawings, there is shown in Figs. 1 and 2 a manually-operated portable dusting device according to the present invention, generally designated by the numeral 10, and including a container or hopper section 12 which is adapted to receive a dusting composition. The container or hopper 12 has an open mouth 14 bridged by a cover 16 pivoted by integral bearings on a pin 18 which permits access to the interior of the hopper for filling. Traversing the lower end of the hopper 12 is a bottom wall 20 formed with three openings 22 for the gravity feed of the dusting composition.

Dependingly supported from the hopper 12 is a housing 24 having an annular bounding wall 26 which has its upper edge terminating in a plane spaced below the plane of the bottom wall 20 of the hopper. In the illustrative form of the invention, the housing 24 is secured to the hopper 12 through provision of one or more screws 28 extending upwardly into enlarged integral portions bounding the bottom wall 20 of the hopper. Traversing the annular wall 26 of the housing 24 are upper and lower partitions 30, 32 which cooperate with the wall 26 to define an annular blower compartment 34. The partition 30 is held in the seat 31 by a number of integral prongs 33 depending from the lower face of the bottom wall 20, as seen in Fig. 2. The upper partition 30 is seen to be engaged within an annular seat 31 cast in the upper edge of the wall 26 and is formed with a central circular opening 30a which communicates with the hopper 12 through the openings 22 via the blower chamber 36. About the periphery of the chamber 36 are a number of main air inlet openings or ports 38 which serve to admit air into the blower chamber or compartment 34 via the opening 30a. Extending tangentially of the blower compartment 34 is an outlet extension or spout 40 which is in communication with the compartment 34. Eccentrically mounted within the compartment is a rotor, generally designated by the numeral 42. It will be appreciated that upon turning of the rotor 42 about its axis, air will be drawn through the main air inlet ports 30a into the blower compartment 34 and thence outwardly through the tangentially communicating spout or outlet extension 40. In that the dusting composition is gravity fed from the container 12 into the compartment by the openings 22, 30a, an admixture of the dusting composition and air will be delivered through the spout 40.

Supported externally of the dusting device 10 is a handle 44, illustrated as of the pistol grip type, which is fixed to the duster through provision of one or more screws 45. In operative relation to the handle 44 is the finger piece 48 of a regulator 46, which serves to selectively control the effective size of the openings 22. The regulator 46 is in the form of a flat plate extending across the openings 22 and formed with openings 46a selectively registerable with the openings 22. The regulator 46 is mounted on a central hub 50 integral with bottom wall 20 such that upon manipulation of the finger piece 48, the rate of gravity feed of the dusting composition may be controlled. The degree of adjustment of the regulator 46 is limited by cooperating slot and pin connections 51, 51a (see Fig. 6).

Disposed within the feed hopper 12 contiguous to the bottom wall 20 thereof, is an agitating member 52, seen best in Fig. 6 to be in the form of an arcuately curved finger mounted on the upper end of an agitating shaft 54. The agitating member is formed with an integral central hub 56 formed with a tapped opening which receives the adjacent threaded end of the agitating shaft 54. It has been found particularly useful to provide the bottom wall or floor 20 of the hopper 12 with a V-shaped annular groove 58 which cooperates with a complementary depending part 60 of the agitating member 52 in directing the dusting composition toward the openings 22.

Operatively connected to the rotor 42 and to the agitating member 52 is a common manually-actuated drive for turning the agitating member at substantially the crank speed, and for turning the rotor 42 at an increased speed ratio. In the illustrative form of the invention, the drive or turning mechanism includes a crank shaft 62 which is journaled in aligned bearing posts 64, 66 and 68 having a crank 70 operatively connected thereto carrying a knob 72 on its free end. Intermediate the posts 66, 68 which provide the bearing for the crank shaft 62 is a bevel gear 74, preferably fabricated of nylon. As illustrated in Fig. 3, the bevel gear 74 is confined against lateral displacement by the adjacent contacting surfaces of the posts 66, 68 and is keyed to the crank shaft 62 for turning at crank speed. The upper end of the post 68 is formed with a seat serving as a bottom end bearing for the agitator shaft 54 which is turned substantially at crank speed through provision of a further gear 76 having a bevel gear section 78 in meshing engagement with the bevel gear 74. The further gear 76 is keyed to the agitating shaft 54 and is preferably fabricated of nylon or a similar non-metallic bearing material suitable for a high speed, low-friction and low-noise transmission. As seen in Fig. 3, the upper surface 68a of the post or upright 68 serves as a lower thrust bearing for the gear 76, an upper thrust bearing being provided by the depending integral flange 80 of the bottom partition 32.

The rotor 42 is driven at an increased speed through provision of an idler spur gear 84 fabricated of nylon and journaled on a stub shaft 86 which is fixed to and supported by the standard 66. The idler spur gear 84 includes one section 88 which meshes as a pinion with the spur gear section 90 of the gear 76 and a further section 85 which contacts a pinion gear 92 fixed to the rotor 42. The pinion 92 is likewise fabricated of nylon and is seen to rest on the well-like depending part 80 of the bottom partition 32. As is well understood, a speed increasing ratio may be obtained by appropriate selection of the gear train to the rotor 42, which includes the bevel gear 74, the meshing bevel gear 78, the spur gear section 90 of the gear 76, the pinion gear section 88 of the gear 84, the spur gear section 85 of the gear 84 and the pinion gear 92 which is keyed directly to the rotor 42. In that all of the gears, namely the gears 74, 76, 84 and 92 are fabricated of nylon and are confined by metallic bearing contact with integral portions of the housing, it has been found possible to attain high speed operation with little friction and at a rather low noise level and without the use of a lubricant.

Turning now to the details of the rotor 42, seen best in Fig. 5, the rotor includes a number of radially extending cupped vanes 94 mounted on a common web or plate 96. The web or plate is spaced from the floor and is below the longitudinal midplane of the rotor compartment 34 such that there is a tendency for the rotor to draw air upwardly through the openings 98 about the pinion gear 92. The opening 98 in the lower partition serves as an auxiliary air inlet port, whereby upon rotor operation there is created an updraft effective to keep dust particles out of the compartment which houses the turning or driving mechanisms.

Still further openings 100 are provided in the gearing housing or compartment 102 which supplements the updraft effect in keeping the dust particles out of the turning or driving mechanisms. As seen best in Figs. 1 and 2, the housing 102 is joined to the rotor compartment 24. Access may be had to the driving or turning mechanisms by the removable housing part 102a (see Fig. 4) which may be fixed in place by a number of screws 104 engaged in the lower partition or wall 32 of compartment 24.

Within the hopper 12 there is disposed an air-circulating means, generally designated by the reference numeral 106, which is intended to create a small amount of air turbulence in the hopper 12 to maintain the dusting composition (i.e. insecticide) in loosened condition whereby the same may be readily dispensed through the opening 22 by the action of the agitating member 52. This means embodies a tubular conduit 108 having a number of nozzle-like openings 110. The conduit 108 may extend partially or completely about the circumference of the bottom wall 20 of the hopper 12 and if desired may be integrally formed therewith during the casting of the hopper 12. The air-dispensing conduit 108 is fed from the rotor compartment 24 by one or more connecting conduits 112 which open at one end into the compartment 24 and at the other end into the conduit 106. Alternative structures are within the contemplation of the present invention for creating a slight amount of turbulence within the hopper 12 to maintain the dusting composition against compacting and to assure the more free and easy delivery of the dusting composition through the dispensing openings 22.

The dusting device of the present invention is very simple and efficient in use. The user merely grasps the pistol grip 44 with one hand and the knob 72 of the crank 70 in the other hand. By directing the nozzle or spout 40 to the general area which is to be dusted it is possible to rapidly and uniformly spread a dusting composition over a comparatively large area. As illustrated, the spout 40 may be provided with an extension terminating in a fan-like blade which helps direct the dusting composition over a prescribed area. Other types of dispensing attachments may be used, as is well understood in the art. During the dispensing operation, the agitating blade member 52 constantly delivers the dusting composition to the openings 22 wherein they are fed by gravity into the blower compartment 24. The action of the blades in the blower compartment, in addition to distributing the dusting composition through the spout 40, is effective to create the requisite amount of turbulence in the hopper 12 via the air-circulating means 10*t* whereby the contents of the hopper is kept in a constant state of agitation. During use over prolonged periods, the housing or compartment 102 which contains the driving mechanism is maintained comparatively free and clear of dust residues despite the continuous exposure thereto. At such time when the dust accumulations become excessive, it is a simple matter to remove the housing part 102*a* for access to the interior of the housing 102 to clear the gearing.

A latitude of modification and substitution is intended in the foregoing disclosure, and in some instances some features of the invention will be used without a corresponding use of other features.

What I claim is:

1. A manually operated portable dusting device comprising a body including a container section having a bottom, an air inlet section below and in communication with said container section and having main air inlet ports, a blower section below said air inlet section and having an annular blower chamber in communication with said main air inlet ports, means affording a passageway for dust material between said container section and said blower chamber, a drive housing section below said blower chamber, fluid conduit means connecting said drive housing section with said blower chamber, an upright shaft arranged eccentrically of said blower chamber and extending from said drive housing section to said container section, rotary agitating means in said container section operatively connected to and driven from said upright shaft, a rotor disposed within said blower chamber and journaled on said shaft for rotation about said shaft as an axis, a crank shaft journaled within said drive housing section, a crank externally of said drive housing section and operatively connected to said crank shaft, gearing operatively connecting said crank shaft to said upright shaft, and gearing of speed increasing ratio operatively connecting said crank shaft to said rotor.

2. A dusting device comprising a container adapted to receive a dusting composition and having a bottom, a housing depending from said container and having an annular wall spaced below the bottom of said container, upper and lower partitions cooperating with said annular wall to form a blower compartment, said bottom and said upper partition having means affording a passageway for dust material between said container and said blower compartment, a rotor disposed within said compartment and eccentrically mounted for rotation about an axis, an outlet extension in communication with said compartment, means providing main air inlet ports in said housing above said compartment, there being at least one opening in said upper partition whereby said rotor when driven may draw air in through said main air inlet ports for admixture with the dusting composition received from said container, means providing auxiliary air inlet ports in said housing below said compartment, there being at least one opening in said lower partition whereby said rotor when driven may draw air in through said auxiliary ports, and drive means extending through the opening in said lower partition and operatively connected to said rotor.

3. A dusting device comprising a container adapted to receive a dusting composition and having a bottom, a housing depending from said container and having an annular wall spaced below the bottom of said container, upper and lower partitions cooperating with said annular wall to form a blower compartment, said bottom and said upper partition having means affording a passageway for dust material between said container and said blower compartment, a rotor disposed within said compartment and eccentrically mounted for rotation about an axis, said rotor including upright vanes and a supporting web in the lower half section of said compartment, an outlet extension in communication with said compartment, means providing main air inlet ports in said housing above said compartment, there being at least one opening in said upper partition whereby said rotor when driven may draw air in through said main air inlet ports for admixture with the dusting composition received from said container, means providing auxiliary air inlet ports in said housing below said compartment, there being at least one opening in said lower partition whereby said rotor when driven causes an updraft in said housing below said compartment, and drive means extending through the opening in said lower partition and operatively connected to said rotor.

4. A manually operated portable dusting device comprising a body including a container section having a bottom, an air inlet section below and in communication with said container section and having main air inlet ports, a blower section below said air inlet section and having an annular blower chamber in communication with said main air inlet ports and a drive housing section below said blower chamber, said housing section having an opening in communication with said blower chamber and having auxiliary air inlet ports, an upright shaft arranged eccentrically of said blower chamber and extending from said drive housing section to said container section, agitating means in said container section operatively connected to and driven from said upright shaft, a rotor disposed within said blower chamber and journaled on said shaft for rotation about said shaft as an axis, said rotor being constructed and arranged to draw its main air supply from said main air inlet port and creating an updraft in said drive housing section by drawing air from said auxiliary air inlet, a crank shaft journaled within said drive housing section, a crank externally of said drive housing section and operatively connected to said crank shaft, gearing operatively connecting said crank shaft to said upright shaft, and gearing of speed increasing ratio operatively connecting said upright shaft to said rotor.

5. A dusting device comprising a container adapted to receive a dusting composition and having a bottom, a housing depending from said container, upper and lower partitions in said housing defining a blower compartment, said bottom and said upper partition having means affording a passageway for dust material between said container and said blower compartment, a rotor disposed within said compartment and eccentrically mounted for rotation about an axis, an outlet extension in communication with said compartment, means providing main air inlet ports in said housing in communication with said compartment whereby said rotor, when driven, may draw air in through said main air inlet ports for admixture with the dusting composition received from said container, and means providing auxiliary air inlet ports in said housing below said compartment, whereby an updraft is created in said compartment.

6. A dusting device comprising a container adapted to receive a dusting composition and having a bottom member, a housing depending from said container and having an annular wall spaced below the bottom member of said container, upper and lower partitions cooperating with said annular wall to form a blower compartment, said bottom member and said upper partition having means affording a passageway for dust material between said container and said blower compartment, a rotor disposed within said compartment and eccentrically mounted for rotation about an axis, an outlet extension in communication with said compartment, means providing main air inlet ports in said housing above said compartment, there being at least one opening in said upper partition whereby said rotor when driven may draw air in through said main air inlet ports for admixture with the dusting composition received from said container, and means in communication with said blower compartment and container and arranged circumferentially about said container for creating turbulence therein to maintain said dusting composition in loosened condition.

7. A dusting device comprising a container adapted to receive a dusting composition and having a bottom, a housing depending from said container and having an annular wall spaced below the bottom of said container, upper and lower partitions cooperating with said annular wall to form a blower compartment, said bottom and said upper partition having means affording a passageway for dust material between said container and said blower compartment, a rotor disposed within said compartment and mounted for rotation, an outlet extension in communication with said compartment, means providing main air inlet ports in said housing above said compartment, there being at least one opening in said upper partition whereby said rotor when driven may draw air in through said main air inlet ports for admixture with the dusting composition received from said container, means providing auxiliary air inlet ports in said housing below said compartment, there being at least one opening in said lower partition whereby said rotor when driven may draw air in through said auxiliary ports, and drive means extending through the opening in said lower partition and operatively connected to said rotor.

8. A dusting device according to claim 7 including means in communication with said blower compartment for creating turbulence in said container to maintain said dusting composition in loosened condition.

9. A dusting device comprising a container adapted to receive a dusting composition and having a bottom, a housing depending from said container and having an annular wall spaced below the bottom of said container, upper and lower partitions cooperating with said annular wall to form a blower compartment, said bottom and said upper partition having means affording a passageway for dust material between said container and said blower compartment, a rotor disposed within said compartment and mounted for rotation, said rotor including upright vanes and a supporting web in the lower half section of said compartment, an outlet extension in communication with said compartment, means providing main air inlet ports in said housing above said compartment, there being at least one opening in said upper partition whereby said rotor when driven may draw air in through said main air inlet ports for admixture with the dusting composition received from said container, means providing auxiliary air inlet ports in said housing below said compartment, there being at least one opening in said lower partition whereby said rotor when driven causes an updraft in said housing below said compartment, and drive means extending through the opening in said lower partition and operatively connected to said rotor.

References Cited in the file of this patent

UNITED STATES PATENTS

| | | |
|---|---|---|
| 411,692 | Strawson | Sept. 24, 1889 |
| 423,814 | Richards | Mar. 18, 1890 |
| 1,394,686 | Redmon | Oct. 25, 1921 |
| 1,806,494 | O'Brien | May 19, 1931 |
| 2,573,784 | Asbury | Nov. 6, 1951 |

FOREIGN PATENTS

| | | |
|---|---|---|
| 58,902 | France | Dec. 2, 1953 |